United States Patent
Li et al.

(10) Patent No.: US 10,698,142 B2
(45) Date of Patent: *Jun. 30, 2020

(54) MULTISPECTRAL SENSING SYSTEM AND METHOD

(71) Applicant: CISTA SYSTEM CORP., Grand Cayman (KY)

(72) Inventors: Zhaojian Li, Fremont, CA (US); Hirofumi Komori, San Jose, CA (US)

(73) Assignee: Cista System Corp., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,505

(22) Filed: Aug. 29, 2019

(65) Prior Publication Data

US 2019/0391306 A1 Dec. 26, 2019

Related U.S. Application Data

(63) Continuation of application No. 15/432,629, filed on Feb. 14, 2017, now Pat. No. 10,444,415.

(51) Int. Cl.
| | |
|---|---|
| *G02B 5/20* | (2006.01) |
| *G06T 3/40* | (2006.01) |
| *G02B 3/00* | (2006.01) |
| *H04N 9/04* | (2006.01) |

(52) U.S. Cl.
CPC .......... *G02B 5/201* (2013.01); *G02B 3/0056* (2013.01); *G06T 3/4015* (2013.01); *H04N 9/04559* (2018.08)

(58) Field of Classification Search
None
See application file for complete search history.

(56) References Cited

U.S. PATENT DOCUMENTS

| | | | |
|---|---|---|---|
| 7,242,478 B1 | 7/2007 | Dombrowski et al. | |
| 10,444,415 B2 * | 10/2019 | Li | H04N 9/04559 |
| 2006/0132660 A1 * | 6/2006 | Kurumisawa | G09G 3/2003 348/631 |
| 2014/0125850 A1 | 5/2014 | Kawai | |
| 2016/0037109 A1 * | 2/2016 | Vogelsong | H04N 5/332 348/216.1 |
| 2017/0099449 A1 * | 4/2017 | Kang | H04N 5/3765 |
| 2017/0131475 A1 * | 5/2017 | Wehner | H01L 28/00 |
| 2018/0234644 A1 | 8/2018 | Li et al. | |

* cited by examiner

*Primary Examiner* — Eileen M Adams
(74) *Attorney, Agent, or Firm* — Sheppard Mullin Richter & Hampton LLP

(57) ABSTRACT

A multispectral sensing device is disclosed. The sensing device may comprise an array of pixel units. Each of the pixel units may comprise four pixels in a two by two configuration. Each of the pixels may comprise a plurality of sub-pixels. Each of the pixel units may include at least one pixel that includes at least two sub-pixels configured to detect light of different wavelengths.

19 Claims, 4 Drawing Sheets

(top view, four pixels of one Bayer-pattern unit)

(side view, one row of the Bayer-pattern unit)

MULTISPECTRAL SENSING SYSTEM AND METHOD

CROSS REFERENCE TO RELATED APPLICATION

The present application is a continuation of U.S. patent application Ser. No. 15/432,629, filed on Feb. 14, 2017, the content of which is hereby incorporated by reference in its entirety.

TECHNICAL FIELD

The present application relates to the technical field of image sensing, and more particularly, to multispectral sensing.

BACKGROUND

Multispectral sensing collects and processes information from across the electromagnetic spectrum. Multispectral images are used in the fields such as remote sensing, agriculture, product quality assessment, security, and surveillance. Conventional multispectral sensing systems capture different spectral channels of the scene, by using either a filter wheel or a beam splitter combined with multiple detectors. Such systems are inadequate for producing high quality images and may require complicated implementation steps.

SUMMARY

One aspect of the present disclosure is directed to a multispectral sensing device. The sensing device may comprise an array of pixel units. Each of the pixel units may comprise four pixels in a two by two configuration. Each of the pixels may comprise a plurality of sub-pixels, and each of the pixel units may include at least one pixel that includes at least two sub-pixels configured to detect light of different wavelengths.

Another aspect of the present disclosure is directed to a multispectral sensing device. The sensing device may comprise an array of pixels. Each of the pixels may comprise a plurality of sub-pixels, and at least two of the sub-pixels in one pixel of the array may be configured to detect light of different wavelengths.

Another aspect of the present disclosure is directed to a multispectral sensing system. The system may comprise a Bayer-pattern array of pixels and a processing circuit. Each pixel may comprise a plurality of sub-pixels. The processing circuit may be coupled to each of the sub-pixels and configured to tune a detection wavelength band of the sub-pixel, causing the sub-pixels to be switchable between detecting light of the same and different wavelength bands. Switching between the various modes can allow the sensing device to detect light of different wavelengths/wavelength bands, thereby producing spectral information of the scene.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present disclosure do not represent all implementations. Instead, they are merely examples of systems and methods consistent with aspects related to the invention as recited in the appended claims.

Conventional approaches for capturing multispectral images are not ideal. Most of such technologies cannot produce high quality images and require complicated implementation steps. For example, a wheel of color filters placed between an object and a regular detector may be used to capture various color/wavelength bands. Since the wavelength bands are captured at different time stamps, the exposure time for the entire image is limited by the speed of rotation of the wheel, which usually takes more time than common shutter operations. Such multi-exposure images may appear more blurry than single-exposure images. Further, the filter and the detector have to be synchronized precisely, because a slight mismatch may generate image defects. For another example, a beam splitter may be used to split light from an object into various color bands refracted to corresponding sensors. Similarly, this system may require precise optical calibration before implementation. Further, separating the colors to different paths is likely to introduce significant path length differences and cause errors in imaging.

A claimed solution rooted in semiconductor engineering overcomes problems arising in the realm of electronic and optical technology. In various embodiments, a multispectral sensing device is disclosed. The sensing device may comprise an array (e.g., a planar array) of pixel units. Each of the pixel units may comprise four pixels (e.g., four pixels arranged in a two by two configuration). In another word, the sensing device may comprise a plurality of pixels in a planar array. For example, the pixel array of the sensing device may be in a Bayer pattern and referred to as a Bayer-pattern array. Accordingly, the pixel unit may be referred to as a Bayer-pattern unit. Each of the pixels may comprise a plurality of sub-pixels, and at least two of the sub-pixels may be configured to detect light of different wavelengths. For example, the plurality of sub-pixels may be four (or another number of) sub-pixels, such that each of the pixel units comprises sixteen sub-pixels, and the sixteen sub-pixels may be configured to detect light of different wavelengths or wavelength bands. In some embodiments, each of the sub-pixels may comprise a plens, an optical filter, and a photodiode. The plens may be disposed above the optical filter, the photodiode may be disposed below the optical filter, the plens may be configured to direct impinging light to pass through the optical filter, and the photodiode may be configured to detect the light passed through the optical filter. Thus, the sensing device can detect multispectral light (e.g., sixteen different wavelength bands) without deploying mechanical filters, beam splitters, or other complicated optical components. Further, when using this sensing device, an image can be obtained by a single exposure of the device, such that the multispectral sensing can be achieved without sacrificing the image quality.

In some embodiments, the four sub-pixels are configured to detect light of different wavelengths. For example, three of the four sub-pixels may be configured to detect visible light, and the other sub-pixel of the four sub-pixels may be configured to detect infrared (IR) light. For example, the three sub-pixels are configured to detect red, blue, and green light respectively, and the other sub-pixel is configured to detect near infrared (NIR) light.

In some embodiments, the wavelength sensing range of each sub-pixel is tunable via a processing circuit. For example, in each sub-pixel, the optical filter is coupled to the processing circuit. The processing circuit may be configured to tune a filtering range of the optical filter by controlling one or more properties of the optical filter. Thus, the wavelength sensing range of each sub-pixel can be tuned by tuning the filtering range of the corresponding optical filter.

In some embodiments, the processing circuit is coupled to the photodiode of each sub-pixel and configured to tune the reading of the multispectral sensing device. The processing circuit may be configured to receive readings of the photodiodes and output the reading of the multispectral sensing device based on one or more of the received readings. In one example, the processing circuit is configured to obtain a total reading of the readings of all photodiode readings in a pixel, and output the total reading as the pixel's reading. In another example, the processing circuit is configured to obtain one photodiode's reading from all photodiodes in a pixel, determine the pixel's reading based on the obtained reading, and output the determined reading as the pixel's reading.

In some embodiments, a multispectral sensing device is disclosed. The sensing device may comprise an array of pixels. Each of the pixels may comprise a plurality of sub-pixels, and at least two of the sub-pixels may be configured to detect light of different wavelengths or wavelength bands. For example, the array may be a Bayer-pattern array, and the plurality of sub-pixels may be configured to detect light of a wavelength or wavelength band different from each other and from sub-pixels of any of eight closest neighboring pixels. For square pixels arranged in the Bayer-pattern array (e.g., in a chess board configuration), any non-border square pixel is surrounded by eight similar square pixels in corresponding relative positions: left, right, front, rear, front left, front right, rear left, and rear right. Similarly, the sensing device may further comprise a processing circuit coupled to the photodiode as discussed above. Thus, the sensing device can detect multispectral light without deploying mechanical filters, beam splitters, or other complicated optical components. Further, when using this sensing device, an image can be obtained by a single exposure of the device, such that the multispectral sensing can be achieved without sacrificing the image quality.

In some embodiments, a multispectral sensing system is disclosed. The system may comprise a Bayer-pattern array of pixels each comprising a plurality of sub-pixels. The system may further comprise a processing circuit coupled to each of the sub-pixels and configured to tune a detection wavelength band of each sub-pixel, causing the sub-pixels to be switchable between detecting light of the same and different wavelength bands. In each Bayer-pattern unit, the pixels may comprise red, green, blue, and infrared pixels. Each of the sub-pixels may comprise an optical filter. The detection wavelength band of the sub-pixel may be tunable through tuning a filtering range of the optical filter. Thus, each pixel can detect one wavelength/wavelength band, two wavelengths/wavelength bands, three wavelengths/wavelength bands, four wavelengths/wavelength bands, etc.

In some embodiments, one or more of the plens, filter, and photodiode of each sub-pixel may be wavelength-specific. For example, the plens or optical filter of the NIR sub-pixel may select NIR light or allow NIR light to pass through. For another example, the photodiode of the NIR sub-pixel may detect NIR light. Thus, for each sub-pixel, it is not necessary to require all of the plens, filter, and photodiode to be wavelength-specific, as long as at least one of them is. Further, the wavelength sensing range of the sub-pixel can thus be tuned by tuning a filtering range of the corresponding optical filter.

The devices and systems disclosed above may apply to visible sensing, non-visible sensing, or a combination of both. For example, the pixels of each pixel unit may comprise a red pixel, a blue pixel, a green pixel, and an IR pixel. R radiation spans wavelengths between approximately 750 nanometers (nm) and 1 millimeter (mm). One commonly used sub-division scheme of IR can include near IR (0.75-1.1 µm); mid-IR (1.1-30 µm); and far IR (30-1,000 µm). In this specification, some embodiments use NIR as an example. The optical filters disclosed herein may include, but are not limited to, visible light color filters (e.g., red color filter, green color filter, etc.) and IR filters (e.g., NIR color filter, mid-IR color filter, etc.). For example, the optical filter can be a NIR filter that selects NIR light or allows NIR light to pass through. Other filters, like IR filter, mid IR filter, or long IR filter, can be used as the optical filter. In some other embodiments, filters that are substantially transparent to ultraviolet (UV) light may be used for UV imaging. Corresponding photodiodes sensitive to UV light may be placed under the UV filters in these types of sensing devices. Similarly, the IR or RGB pixel (including its associated plens, filter, and photodiode) may be replaced by another pixel of any wavelength to achieve multispectral sensing disclosed herein.

Figure 1A:
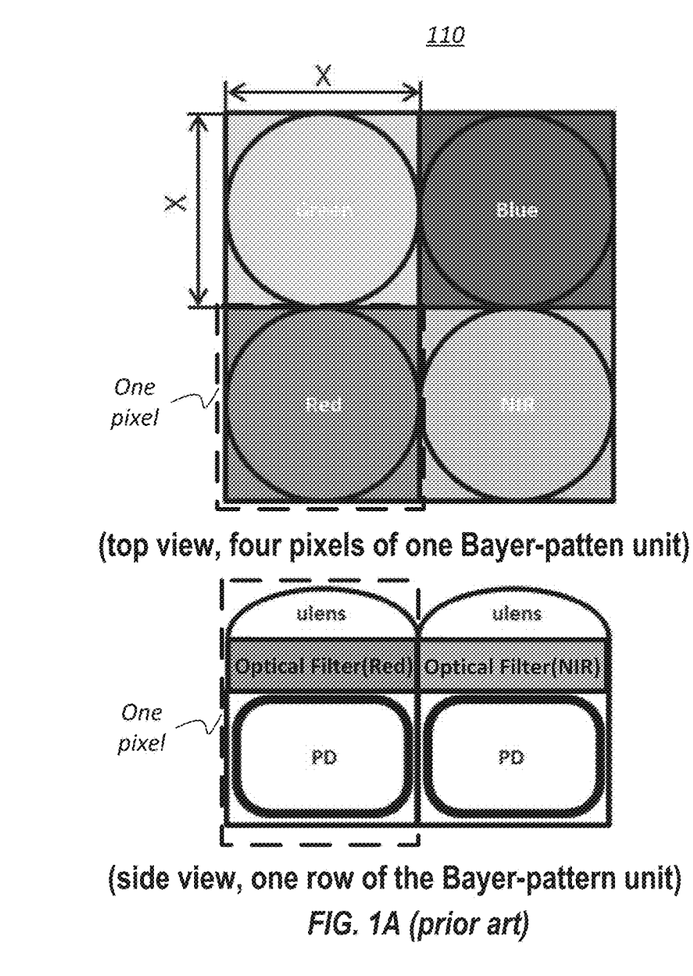
FIG. 1A is a graphical representation illustrating a Bayer-pattern unit of an image sensor in prior art from both top and side views.

FIG. 1A is a graphical representation 110 illustrating a Bayer-pattern unit of an image sensor in prior art from both top and side views. The multispectral sensor may be a solid-state (e.g., CCD, CMOS) sensor. Such sensor comprises pixels in a Bayer-pattern array. A typical Bayer-pattern unit is shown in FIG. 1A top view. From the top view, four pixels of the Bayer-pattern unit are shown as four squares, associated with a green filter, a red filter, a blue filter, and a NIR filter. Each pixel or filter has the identical dimension of width X. A typical value for width X is 3.0 µm. Each square comprises a circle representing a micro lens (plens). Referring to FIG. 1A side view, for each pixel, the plens is disposed on the associated optical filter (OF), which is on top of an associated photodiode (PD). The optical filter may select red, green, blue, or NIR light.

Figure 1B:
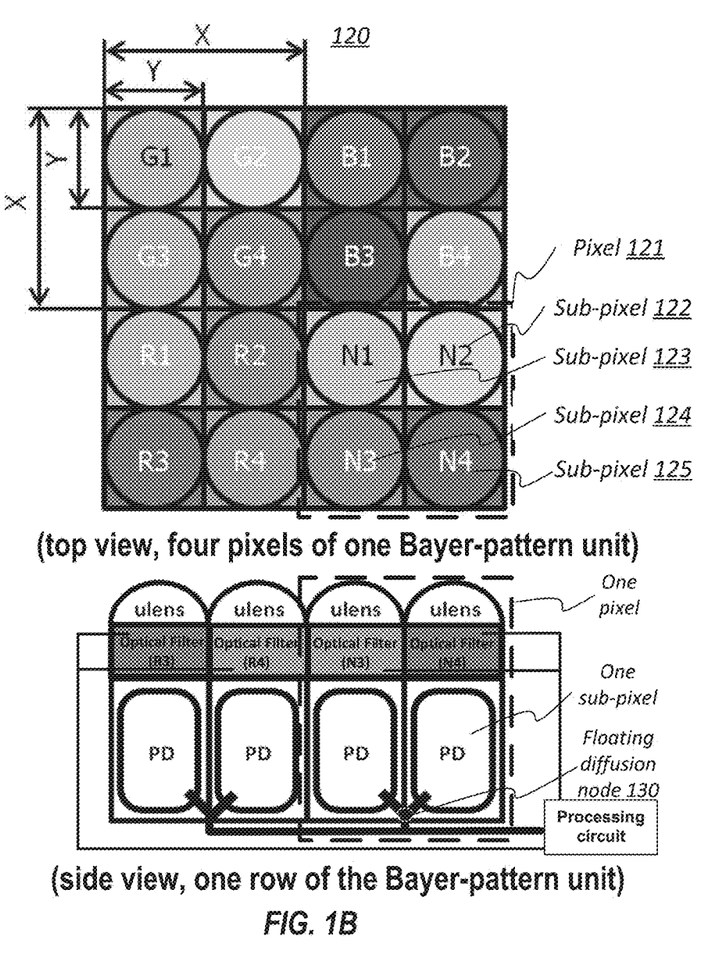
FIG. 1B is a graphical representation illustrating a Bayer-pattern unit of a multispectral sensor from both top and side views, consistent with the exemplary embodiments of the present disclosure.

FIG. 1B is a graphical representation 120 illustrating a Bayer-pattern unit of a multispectral sensor from both top and side views, consistent with the exemplary embodiments of the present disclosure. Based on FIG. 1B, a multispectral sensing device as disclosed may comprise an array of such Bayer-pattern units.

The graphical representation 120 shows four pixels each of width X, the four pixels forming the Bayer-pattern unit. In some embodiments, the pixels may be configured to detect red, green, blue, and NIR. Alternatively, each pixel may be configured to detect another wavelength. Each pixel may comprise multiple sub-pixels of width Y. In this figure, each pixel of width X comprises four sub-pixels of width Y. The width Y and width X can have various lengths. An exemplary length for Y is 1.5 µm, and an exemplary length for X is 3.0 µm.

The Bayer-pattern described herein may include various modifications in addition to those shown in FIGS. 1A and 1B. In some embodiments, the optical filters, pixels, and sub-pixels in a Bayer-pattern unit may include any color, such as RGBG (red, green, blue, green), CYGM (cyan, yellow, green, magenta), and RGBE (red, green, blue, emerald), etc. That is, the optical filters, pixels, and sub-pixels are not limited to red, green, and blue. Moreover, multiple pixels and corresponding filters in a Bayer-pattern unit may be oriented in various configurations, e.g., rotated by 45 degrees. Further, each pixel can be divided into any number of sub-pixels of any shapes, and each sub-pixel can be individually controlled in terms of the integration time, thereby achieving multiple integration times within the same pixel. Therefore, the disclosed systems, methods, and devices similarly apply to any of the modified Bayer-pattern sensor designs.

From the top view as shown, the Bayer-pattern unit may comprise four pixels (e.g., one of the pixels being pixel 121). Each pixel may comprise four sub-pixels (e.g., the pixel 121 comprises sub-pixels 122, 123, 124, and 125). The four pixels may be configured to detect red, blue, green, and NIR light respectively. Here, the red, blue, green, and NIR light may each refer to a wavelength range, within which the corresponding sub-pixels in each pixel can detect various wavelength bands. For example, the sub-pixels in the green pixel may be configured to detect dark green, green, light green, etc. Thus, for the Bayer-pattern unit shown in this figure, up to sixteen different wavelengths/wavelength bands can be detected simultaneously to achieve multispectral sensing. Each of the sub-pixels may be labeled by a corresponding wavelength (e.g., B1=420 nm, B2=450 nm, B3=480 nm, B4=500 nm, G1=520 nm, G2=550 nm, G3=580 nm, G4=600 nm, R1=620 nm, R2=650 nm, R3=680 nm, R4=700 nm, N1=750 nm, N2=850 nm, N3=900 nm, N4=950 nm, wherein B refers to blue, G refers to green, R refers to red, and N refers to NIR) or wavelength band (e.g., B1=415-425 nm, B2=445-455 nm, B3=475-485 nm, B4=495-505 nm, G1=515-425 nm, G2=545-555 nm, G3=575-585 nm, G4=595-605 nm, R1=615-625 nm, R2=645-655 nm, R3=675-685 nm, R4=695-705 nm, N1=745-755 nm, N2=845-855 nm, N3=895-905 nm, N4=945-955 nm). In some embodiments, the sub-pixels do not have to be grouped by wavelength. That is, the sixteen sub-pixels in each Bayer-pattern unit may be configured to detect any wavelength band, and their positions with respect to each Bayer-pattern unit plane may be random.

From the side view as shown, each sub-pixel may include a photodiode, a plens, and an optical filter (OF). In this side view, only one row of the sub-pixels is shown. Thus, only two sub-pixels are shown for each pixel. The plens is disposed above the optical filter, and the photodiode is disposed below the optical filter. Each plens may be substantially aligned with its corresponding photodiode, such that most of the photons impinging on the plens can be directed to pass the optical filter and detected by the photodiode. The photodiode generates charges (e.g., electrons and holes) in response to the light exposure to perform the detection. Each photodiode may be coupled to a processing circuit (e.g., via a column readout circuit described below with reference to FIG. 2). It is also possible that two or more photodiodes share the same coupling channel to the processing circuit.

In some embodiments, each optical filter is coupled to the processing circuit, and the sensing range of each sub-pixel is tunable via the processing circuit. For example, the optical filter may be a liquid crystal tunable filter, an acousto-optic tunable filter, an electromagnetic glass filter, etc. The processing circuit may be configured to control or actuate a current or voltage supplied to each optical filter to effectuate the filtering range tuning. Thus, the wavelength sensing range of each sub-pixel can be tuned by tuning the filtering range of the corresponding optical filter from the processing circuit. Alternatively, one or more the optical filters may be non-tunable and designed to allow light of a corresponding wavelength or wavelength band to pass.

In some embodiments, the processing circuit is coupled to the photodiode of each sub-pixel and configured to tune the reading of the multispectral sensing device. The processing circuit may be configured to receive readings of the photodiodes and output the reading of the multispectral sensing device based on one or more of the received readings. In one example, the processing circuit is configured to obtain a total reading of all photodiode readings in each pixel, and output the total reading as the pixel's reading. There may be various methods to obtain the total reading. For example, electron signals generated at the sub-pixels from an exposure may be converted to voltage signals at an output node or at the corresponding pixel or sub-pixel. Then, the processing circuit may receive the voltage signals pixel by pixel (e.g., via binning) or sub-pixel by sub-pixel (e.g., via individual photodiode readout). With respect to the binning, the photodiodes in each pixel may be binned together and read by the processing circuit. For example, FIG. 1B shows two photodiodes in a pixel binned to a floating diffusion node 130. Since FIG. 1B is only a side view and a pixel may comprise four sub-pixels arranged in a two by two configuration, four photodiodes corresponding to four sub-pixels in a pixel may be binned to a floating diffusion node. With respect to the individual photodiode readout, the photodiodes in each pixel may be individually read by the processing circuit, and the processing circuit may sum the photodiode signals for each pixel. In another example, the processing circuit is configured to obtain the reading of one photodiode out of all photodiodes in each pixel, determine the pixel's reading based on the obtained reading (e.g., by multiplying the obtained reading by the number of photodiodes in the pixel), and output the determined reading as the pixel's reading. Similarly, the processing circuit may obtain the reading(s) of any subset of photodiode(s) out of all photodiodes in each pixel to determine the pixel's reading. U.S. application Ser. No. 15/363,873, filed on Nov. 29, 2016, and titled "System and Method for High Dynamic Range Image Sensing", and U.S. application Ser. No. 15/415,376, filed on Jan. 25, 2017, and titled "System and Method for Visible and Infrared High Dynamic Range Sensing" provide more details on the processing circuit, binning circuits and methods, and methods on obtaining readings from the pixels. Both of the applications are assigned to the same assignee as the present application and both are incorporated herein by reference.

A person having ordinary skill in the art should be able to select photodiodes with particular materials sensitive to certain wavelengths. For example, photodiodes that are sensitive to visible light can be placed under RGB filters. Photodiodes that are sensitive to infrared light, or particularly to near infrared light, such as silicon photodiodes (with broad detection spectrum and particular thickness) can be placed under the NIR filter. The plens and the optical filter may have a working range covering the detection range of the corresponding photodiode, such that even if the detection range changes, the corresponding plens and optical filter do not have to change.

Figure 2:
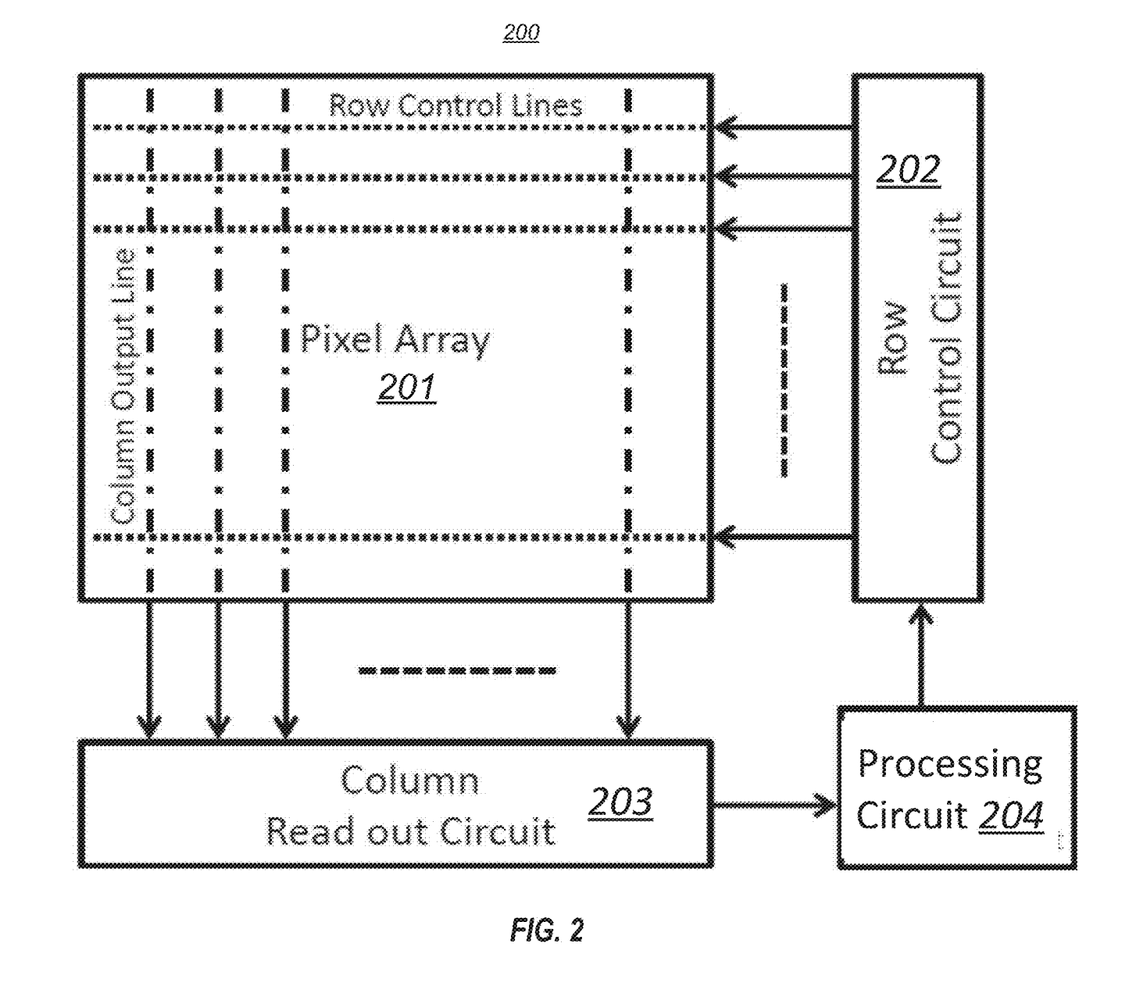
FIG. 2 is a schematic circuit diagram illustrating a multispectral sensor system, consistent with the exemplary embodiments of the present disclosure.

FIG. 2 is a schematic circuit diagram illustrating a multispectral sensing system 200, consistent with the exemplary embodiments of the present disclosure. The system 200 may comprise a pixel array 201, a row control circuit 202, a column readout circuit 203, and a processing circuit 204. The pixel array 201 may comprise multiple pixels arranged by row and column and associated circuits, e.g., pixels shown in FIG. 1B. Each pixel row is coupled to row control circuit 202, and each pixel column is coupled to the column readout circuit 203. The row control circuit 202 may control readout timing in each row, and the column readout circuit 203 may receive pixel signals from each column. The processing circuit 204 may control the row control circuit 202 and the column readout circuit 203 in terms of clock timing, signal processing (e.g. receiving readings from the photodiodes and processing the readings), signal control (e.g., controlling the current and/or voltage supplied to each optical filter), etc. The above circuit is merely exemplary, and other possible variations of circuit control may be implemented.

During one exemplary exposure of the photodiode sensor, the photodiodes in the pixel array 201 may convert impinging photons into charges (e.g., electrons and/or holes). The charges are integrated (collected) in corresponding sensor sub-pixels or pixels. After the completion of integration cycle, the collected charges are converted into voltages. The voltages are supplied to the output terminals and coupled to column readout circuit 203. In CMOS image sensors, the charge to voltage conversion is accomplished directly in the pixels themselves. The analog pixel voltage is transferred to the output terminals through various pixel addressing and scanning schemes controlled by the row control circuit 202. The analog signal can also be converted on-chip to a digital equivalent before reaching the chip output.

In some embodiments, the processing circuit 204 may be configured to tune the detection wavelength band of each of the photodiodes, such that the photodiodes in each pixel may be configured to detect the same wavelength band, or two or more different wavelength bands as discussed below with reference to FIGS. 3A and 3B.

Figure 3A:
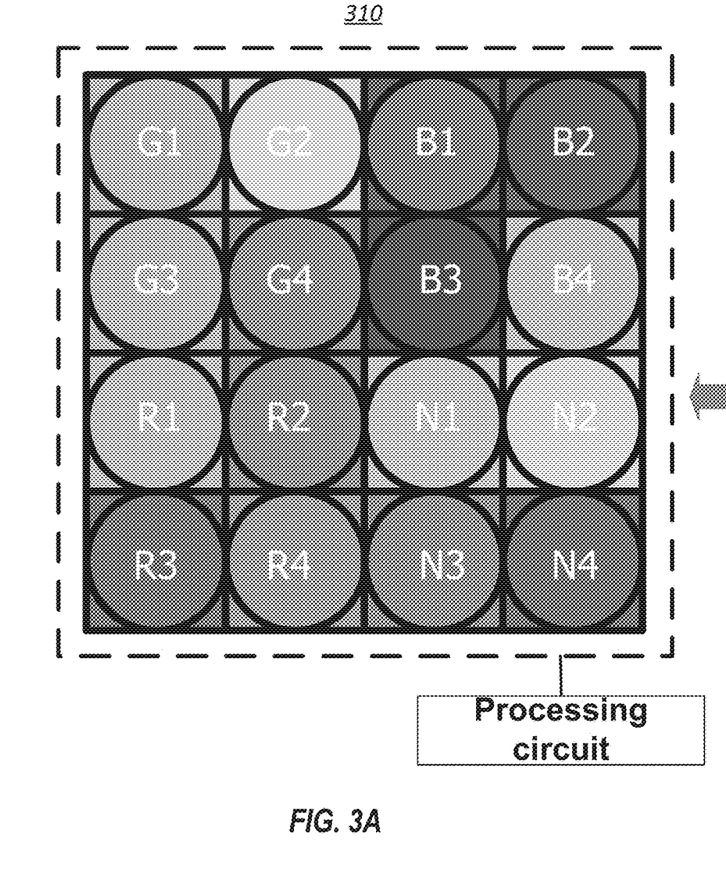
FIGS. 3A and 3B are graphical representations illustrating filtering range tuning in a multispectral sensor, consistent with the exemplary embodiments of the present disclosure.
Figure 3B:
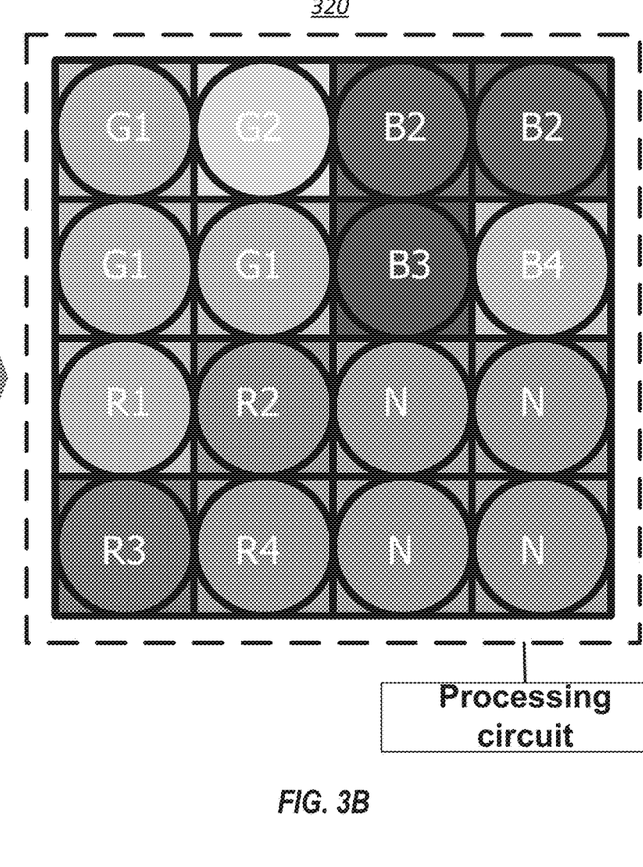

FIGS. 3A and 3B are graphical representations illustrating filtering range tuning in a multispectral sensor, consistent with the exemplary embodiments of the present disclosure. FIGS. 3A and 3B each show a Bayer-pattern unit of sixteen sub-pixels in mode 310 and mode 320 with a processing circuit. Each of the sub-pixels is labelled to indicate its detection wavelength. For example, the top left sub-pixels in both figures are configured to detect light of wavelength G1. In FIG. 3A, all sixteen photodiodes are configured to detect different wavelengths (e.g., G1, G2, B1, B2, etc.). G1, G2, G3, and G4 may refer to four different wavelength substantially in the green wavelength range, but different from each other. The mode 310 can be switched to the mode 320 or a different configuration and vice versa. To switch to the mode 320, G3 and G4 in the mode 310 are tuned to G1, so the green pixel comprises two different detection wavelengths G1 and G2; B1 is tuned to B2, so the blue pixel comprises three different detection wavelengths B2, B3, and B4; R1, R2, R3, and R4 are unchanged, so the red pixel still comprises four different detection wavelength; N1, N2, N3, and N4 are all tuned to N, so the NIR pixel comprises one detection wavelength N. The wavelength tuning may be achieved by the filtering range tuning described above, since the individual optical filter may be actuated by the processing circuit in terms of its filtering range. Similarly, the mode 320 can be switched back to the mode 310. Thus, the optical filters in each pixel may be switchable between having the same filtering range and different filtering ranges, causing the sensing device to be switchable, for example, between sensing more than four wavelength bands and four wavelength bands.

Switching between the various modes can allow the sensing device to detect light of different wavelengths/wavelength bands, thereby producing spectral information of the scene.

The modes 310 and 320 are merely exemplary. The above example illustrates that each pixel can be tunable among detecting one, two, . . . , N wavelength ranges, where N is the number of sub-pixels of the pixel. By the same principle, each Bayer-pattern unit may be tunable among from detecting one, two, . . . , M wavelength ranges, where M is the number of sub-pixels of the Bayer-pattern unit.

Figure 4A:
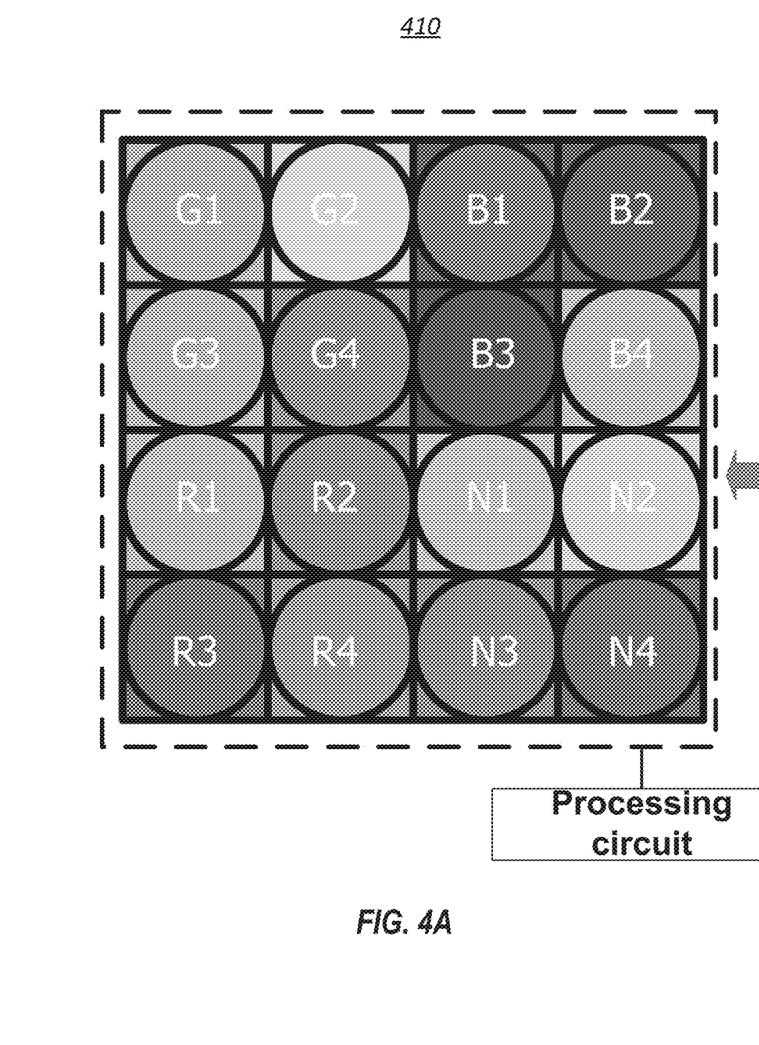
FIGS. 4A and 4B are graphical representations illustrating sensing reading tuning in a multispectral sensor, consistent with the exemplary embodiments of the present disclosure.
Figure 4B:
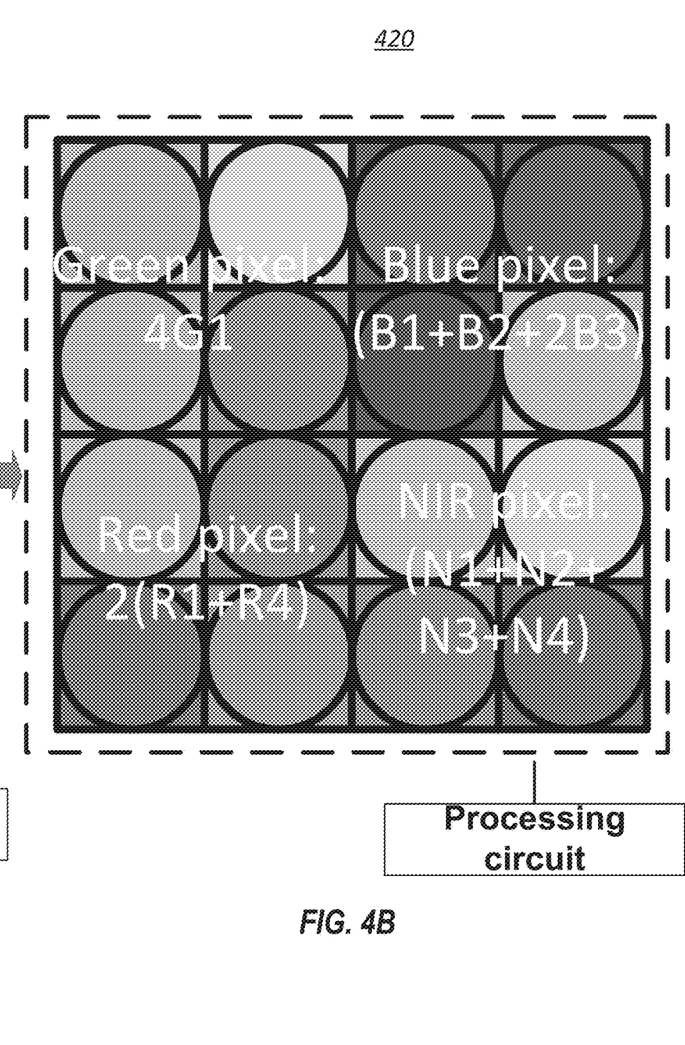

FIGS. 4A and 4B are graphical representations illustrating sensing reading tuning in a multispectral sensor, consistent with the exemplary embodiments of the present disclosure. FIGS. 4A and 4B each show a Bayer-pattern unit of sixteen sub-pixels in mode 410 and mode 420 with a processing circuit. Similar to FIG. 3A, each of the sub-pixels in FIG. 4A is labelled to indicate its detection wavelength.

In some embodiments, the processing circuit may be configured to receive readings of the sixteen photodiodes and output the reading of the Bayer-pattern unit based on one or more of the received readings. For the green pixel, the processing circuit may determine the green pixel reading based on the G1 reading alone. Thus, in mode 420, the processing circuit may multiply G1 by 4 (the number of sub-pixels) to obtain 4G1 as the output of the green pixel. For the blue pixel, the processing circuit may replace B4 with B3, to obtain (B1+B2+2B3) as the output of the blue pixel. For the red pixel, the processing circuit may replace R2 with R1 and replace R3 with R4, to obtain 2(R1+R4) as the output of the red pixel. For the NIR pixel, the processing circuit may add up all sub-pixel readings (N1+N2+N3+N4) to obtain the output of the NIR pixel. The method applied to the NIR pixel may be known as binning, as the photodiodes in this pixel are binned together to derive a total reading. The mode 410 and the mode 420 may be switchable back and forth by the processing circuit.

The reading methods for the pixels above are merely exemplary. The processing circuit may determine the reading method for each pixel based on various conditions, such as user settings, sensing conditions, pixel conditions, etc. It is possible to apply the binning method to all pixels in a multispectral sensing device, or determine one from all photodiode readings in each pixel to obtain the pixel's reading. Thus, the sensing device can detect multispectral light without deploying mechanical filters, beam splitters, or other complicated optical components. Further, enabled by electronic signals for mode switching, the sensing device can flexibly detect a configurable number of wavelengths/wavelength bands.

The specification has described methods, apparatus, and systems for multispectral sensing. As shown above, each sensing device or system can simultaneously detect light of n different wavelengths, with n being any natural number and as long as the fabrication permits. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A multispectral sensing device, comprising:
a plurality of pixels, each of the pixels comprising:
a plurality of sub-pixels, at least one of the sub-pixels comprising:
a tunable optical filter,
wherein the tunable optical filter has a wavelength sensing range that is tunable; and
wherein the at least one of the sub-pixels comprises:
a first sub-pixel comprising a first tunable optical filter; and
a second sub-pixel comprising a second tunable optical filter;
wherein the first tunable optical filter is tunable to a different wavelength sensing range than the second tunable optical filter.

2. The multispectral sensing device of claim 1, wherein the at least one of the sub-pixels further comprises:
a photodiode disposed below the optical filter, wherein the photodiode is configured to detect the light passed through the optical filter.

3. The multispectral sensing device of claim 2, wherein the at least one of the sub-pixels further comprises:
a μlens disposed above the optical filter, wherein the μlens is configured to direct impinging light to pass through the optical filter.

4. The multispectral sensing device of claim 1, further comprising:
a processing circuit coupled to each tunable optical filter and configured to tune a filtering range of each tunable optical filter.

5. A multispectral sensing device, comprising:
a plurality of pixels, each of the pixels comprising:
a plurality of sub-pixels, at least one of the sub-pixels comprising:
a tunable optical filter,
wherein the tunable optical filter has a wavelength sensing range that is tunable;
wherein the at least one of the sub-pixels further comprises: a photodiode disposed below the optical filter, wherein the photodiode is configured to detect the light passed through the optical filter; and
a processing circuit coupled to the photodiodes of the sub-pixels, wherein the processing circuit is configured to obtain a reading of at least one photodiode in one of the pixels, and output a pixel reading based on the reading of the at least one photodiode;
wherein the processing circuit is further configured to obtain sub-pixel readings of a plurality of the photodiodes in one of the pixels, and output a pixel reading based on a sum of the sub-pixel readings.

6. The multispectral sensing device of claim 5, wherein the at least one of the sub-pixels further comprises:
a photodiode disposed below the optical filter, wherein the photodiode is configured to detect the light passed through the optical filter.

7. The multispectral sensing device of claim 6, wherein the at least one of the sub-pixels further comprises:
a μlens disposed above the optical filter, wherein the μlens is configured to direct impinging light to pass through the optical filter.

8. The multispectral sensing device of claim 5, further comprising:
a processing circuit coupled to each tunable optical filter and configured to tune a filtering range of each tunable optical filter.

9. A multispectral sensing device, comprising:
a plurality of pixels, each of the pixels comprising:
a plurality of sub-pixels, at least one of the sub-pixels comprising:
a tunable optical filter,
wherein the tunable optical filter has a wavelength sensing range that is tunable;
wherein the at least one of the sub-pixels further comprises: a photodiode disposed below the optical filter, wherein the photodiode is configured to detect the light passed through the optical filter; and
a processing circuit coupled to the photodiodes of the sub-pixels, wherein the processing circuit is configured to obtain a reading of at least one photodiode in one of the pixels, and output a pixel reading based on the reading of the at least one photodiode;
wherein the processing circuit is further configured to obtain a sub-pixel reading of one of the photodiodes in one of the pixels, and output a pixel reading based on the sub-pixel reading.

10. The multispectral sensing device of claim 9, wherein the at least one of the sub-pixels further comprises:
a photodiode disposed below the optical filter, wherein the photodiode is configured to detect the light passed through the optical filter.

11. The multispectral sensing device of claim 10, wherein the at least one of the sub-pixels further comprises:
a µlens disposed above the optical filter, wherein the µlens is configured to direct impinging light to pass through the optical filter.

12. A multispectral sensing device, comprising:
a plurality of pixels, each of the pixels comprising:
a plurality of sub-pixels, at least one of the sub-pixels comprising:
a tunable optical filter,
wherein the tunable optical filter has a wavelength sensing range that is tunable; and
an array of pixel units, each comprising a plurality of the pixels, wherein
each of the pixels comprises four sub-pixels,
each of the pixel units comprises sixteen sub-pixels, and
the sixteen sub-pixels are configured to detect light of different wavelengths or wavelength bands.

13. The multispectral sensing device of claim 12, wherein each of the pixel units comprises:
four of the pixels in a two by two configuration.

14. The multispectral sensing device of claim 13, wherein the array is a Bayer-pattern array.

15. An apparatus, comprising:
a pixel, comprising:
a plurality of sub-pixels, at least one of the sub-pixels comprising:
a tunable optical filter,
wherein the tunable optical filter has a wavelength sensing range that is tunable;
wherein the at least one of the sub-pixels comprises:
a first sub-pixel comprising a first tunable optical filter; and
a second sub-pixel comprising a second tunable optical filter;
wherein the first tunable optical filter is tunable to a different wavelength sensing range than the second tunable optical filter.

16. The apparatus of claim 15, wherein the at least one of the sub-pixels further comprises:
a µlens disposed above the optical filter, wherein the µlens is configured to direct impinging light to pass through the optical filter.

17. An apparatus, comprising:
a pixel, comprising:
a plurality of sub-pixels, at least one of the sub-pixels comprising:
a tunable optical filter,
wherein the tunable optical filter has a wavelength sensing range that is tunable;
a processing circuit coupled to the photodiodes of the sub-pixels, wherein the processing circuit is configured to obtain a reading of at least one photodiode in the pixel, and to output a pixel reading based on the reading of the at least one photodiode; and
wherein the at least one of the sub-pixels further comprises: a photodiode disposed below the optical filter, wherein the photodiode is configured to detect the light passed through the optical filter; and
wherein the processing circuit is further configured to obtain sub-pixel readings of a plurality of the photodiodes in the pixel, and output a pixel reading based on a sum of the sub-pixel readings.

18. The apparatus of claim 17, further comprising:
a processing circuit coupled to each tunable optical filter and configured to tune a filtering range of each tunable optical filter.

19. An apparatus, comprising:
a pixel, comprising:
a plurality of sub-pixels, at least one of the sub-pixels comprising:
a tunable optical filter,
wherein the tunable optical filter has a wavelength sensing range that is tunable;
a processing circuit coupled to the photodiodes of the sub-pixels, wherein the processing circuit is configured to obtain a reading of at least one photodiode in the pixel, and to output a pixel reading based on the reading of the at least one photodiode; and
wherein the at least one of the sub-pixels further comprises: a photodiode disposed below the optical filter, wherein the photodiode is configured to detect the light passed through the optical filter; and
wherein the processing circuit is further configured to obtain a sub-pixel reading of one of the photodiodes in the pixel, and output a pixel reading based on the sub-pixel reading.

* * * * *